June 2, 1970        M. S. LIPSETT        3,516,009

HIGH STABILITY LASER

Filed July 27, 1967

INVENTOR
Morley S. Lipsett

Edward D. Murphy
ATTORNEY

United States Patent Office 3,516,009
Patented June 2, 1970

3,516,009
HIGH STABILITY LASER
Morley S. Lipsett, Norwalk, Conn., assignor to The Perkin-Elmer Corporation, Norwalk, Conn., a corporation of New York
Filed July 27, 1967, Ser. No. 656,588
Int. Cl. H01s 3/02
U.S. Cl. 331—94.5    5 Claims

ABSTRACT OF THE DISCLOSURE

A gas laser having a small diameter discharge tube supported at both ends by a large diameter reservoir tube. A cathode and anode are provided for establishing a discharge within which stimulated emission of radiation occurs. The cathode is mounted in the wall of the reservoir tube so that the ends of the discharge tube through which the radiation passes are shielded from sputtered cathode material. The discharge passes from the cathode through a portion of the reservoir tube and into the discharge tube through an aperture. Mirrors optically aligned with the discharge tube provide a resonant cavity within which the laser beam is developed.

---

This invention relates to gas lasers and more particularly relates to an improved, high stability gas laser.

Typical gas lasers generally include a resonant cavity, a sealed enclosure containing an appropriate gas such as a mixture of helium and neon, and a discharge path in the enclosure, the major portion of which lies within the resonant cavity. Anode and cathode means are provided to establish and maintain a discharge in the gas. The enclosure comprises a vitreous material and is hermetically sealed by windows angled so as to permit non-reflective transmission of radiation. The resonant cavity is defined by a pair of mirrors between which radiation is reflected to produce stimulated emission. An output beam is obtained by making one of the mirrors slightly transmissive.

Previous gas lasers, particularly of the helium-neon type, have been subject to several difficulties. For example, due to the requirement of a restricted path for the discharge, the tubes have been of small diameter and therefore have been susceptible to vibration. Thus, acoustic or mechanical shocks often cause the output wavelength to oscillate since tube vibration causes the angle of the end windows to vary and this affects the optical path length. The danger of shock breakage is also increased. Another difficulty is that helium can escape through the walls of the tube. Since the discharge tube must be small, the helium supply is small and the lifetime of the tube is limited. Finally, if the laser tube is not properly constructed, materials sputtered from the cathode during operation can collect on the end members of the discharge tube, thus decreasing the intensity of light obtainable from the device. The present invention is directed to an improved gas laser construction which overcomes these difficulties and provides several additional advantages.

Accordingly, it is an object of this invention to provide a new and improved gas laser construction wherein the sensitivity to mechanical vibrations is substantially reduced.

Another object of this invention is the provision of a new and improved laser construction which includes a large gas reservoir.

Another object of this invention is the provision of a new and improved laser wherein cooling of the discharge tube is improved.

Briefly, in accord with one embodiment of this invention, I provide an improved high stability laser which includes a gas enclosure comprising coaxially arranged discharge and reservoir tubes, the discharge tube being supported at each end by the reservoir tube. An aperture is provided in the discharge tube so that the discharge runs from a cathode mounted in the reservoir tube through a portion of the reservoir tube, through the aperture and along the length of the discharge tube, terminating at an anode located adjacent one end of the discharge tube. A gas supply is provided within the discharge and reservoir tubes, for example, the conventional mixture of helium and neon. Hermetic enclosure of the gas is completed by providing the usual closure members such as Brewster windows adjacent the ends of the discharge tube which permit lossless transmission of radiation. Stimulated emission is achieved by providing a resonant cavity optically aligned with the discharge tube.

The novel features believed characteristic of the invention are set forth in the appended claims. The invention itself, together with further objects and advantages thereof, may best be understood by reference to the following description taken in connection with the appended drawings in which:

Figure 1:
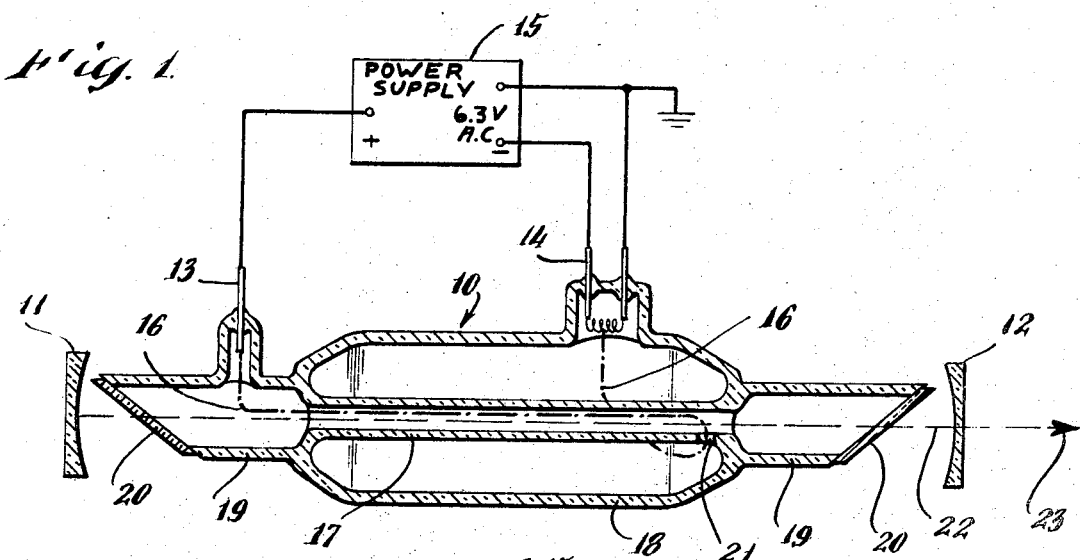
FIG. 1 is a cross-sectional view of a preferred embodiment of the present invention.

The novel laser illustrated in FIG. 1 comprises a gas enclosure 10 located within a resonant cavity defined by mirrors 11 and 12. A suitable gas is provided within the enclosure 10 so that, upon the application of sufficient voltage between an anode electrode 13 and cathode 14 by power supply 15, a discharge is established and maintained along the path defined by the dash-dot line 16. When the radiation emitted by the discharge in the direction of the axis of the resonant cavity is reflected upon itself by mirrors 11 and 12, stimulated emission occurs and a coherent light beam is obtained from the device by making one of the mirrors, for example mirror 12, a few percent transmissive. The following description will be made in terms of the conventional helium-neon gas mixture, that is, $He^3$ and Ne at a suitable pressure and mixed in an appropriate ratio. As a specific example, a total pressure of 2 mm. of Hg and a ratio of 24 parts $He^3$ to one part Ne is suitable. It is noted, however, that the laser construction described and claimed is generally applicable to other gas mixtures.

In particular accord with this invention, the enclosure 10, usually of a vitreous material such as glass or ceramic, comprises a double tube construction including an inner discharge tube 17 and an outer reservoir tube 18. The discharge tube 17 is a small diameter hollow cylinder located coaxially with the resonant cavity and is supported at each end by the large diameter reservoir tube 18. The gas enclosure 10 is completed by a suitable end structure such as tubular extensions 19 and Brewster windows 20 which are sealed to the extensions 19 and angled to permit lossless transmission of the emitted radiation.

An aperture 21 is provided in the wall of the discharge tube to allow passage of the discharge between the anode and the cathode. Although this aperture may be located at any point in the discharge tube, it is preferred that it be located on the opposite side of the discharge tube from the cathode. This limits the possibility that material sputtered from the cathode by the arc will enter the discharge tube. In conventional lasers, the sputtered material can enter the discharge tube where it collects on the end windows, thus reducing the output of the laser.

By means of the illustrated construction, several objectives are achieved. Of particular importance is the provision of a small diameter discharge tube which prevents the discharge from spreading through a large cross-sectional area coupled with a substantially decreased susceptibility to the effects of vibrations provided by the large diameter-to-length ratio of the reservoir tube. In the preferred construction, the two tubes are constructed from a single glass body and thus the support provided for tube 17 is rigid. In general, this invention is directed to the concept of supporting both ends of a restricted discharge tube within a second tube having a larger diameter and rigidly attaching elements which affect the optical path length to the larger diameter tube. Since stiffness is proportional to the cube of the diameter-to-length ratio, the use of the large reservoir tube stiffens the structure and reduces the danger of breakage and of wavelength oscillation due to vibration of the end members. For example, a flexible connection between tube 17 and tube 18 could be used as long as the Brewster windows 20 are attached to the tube 18.

A further benefit achieved by virtue of the construction described is that a large gas reservoir is provided within the tube 18. Thus, the operational lifetime of the laser, before the gas supply is depleted due to gas clean-up, is increased. This is of particular importance when helium is involved since this gas can escape through the walls.

Several other advantages are also realized due to this construction. For this example, the construction described can conveniently be produced as a unitary glass member, thus facilitating the process of baking impurities from the walls during manufacture. Furthermore, the present construction allows installation of the electrodes after the rest of the tube, including the precisely aligned end windows, has been completed without disturbing this alignment. This prevents contamination of the cathode. Also, the present invention avoids the necessity of clamping the discharge tube by a metallic member which, although grounded, can produce oscillation in the discharge. In the case of the helium-neon laser, the large quantity of helium surrounding the discharge tube provides rapid and uniform cooling of the discharge tube.

In an operation device, the length of the discharge tube may be approrimately three inches, the inner diameter may be about 2 mm. and the inner diameter of the reservoir tube may be about 2.5 cm. In this case, a voltage of about 5 kilovolts is applied between the anode and the cathode and a heater voltage of approximately 6 volts is applied across the coil 15a. An arc discharge is initiated through the gas where upon the voltage drops to approximately 1 kilovolt and the current stabilizes at about 3 milliamps. In general terms, the energy of the arc excites the helium which in turn collides with the neon, raising it to an excited energy level. The neon then undergoes a radiative transmission to an intermediate energy level and return to the ground state upon collision with the wall of the discharge tube. The radiation emitted by the neon is reflected along the optical axis of the laser cavity between mirrors 11 and 12 as indicated by dotted line 22 and an output beam is extracted from one of the mirrors as indicated arrow 23.

Figure 2:
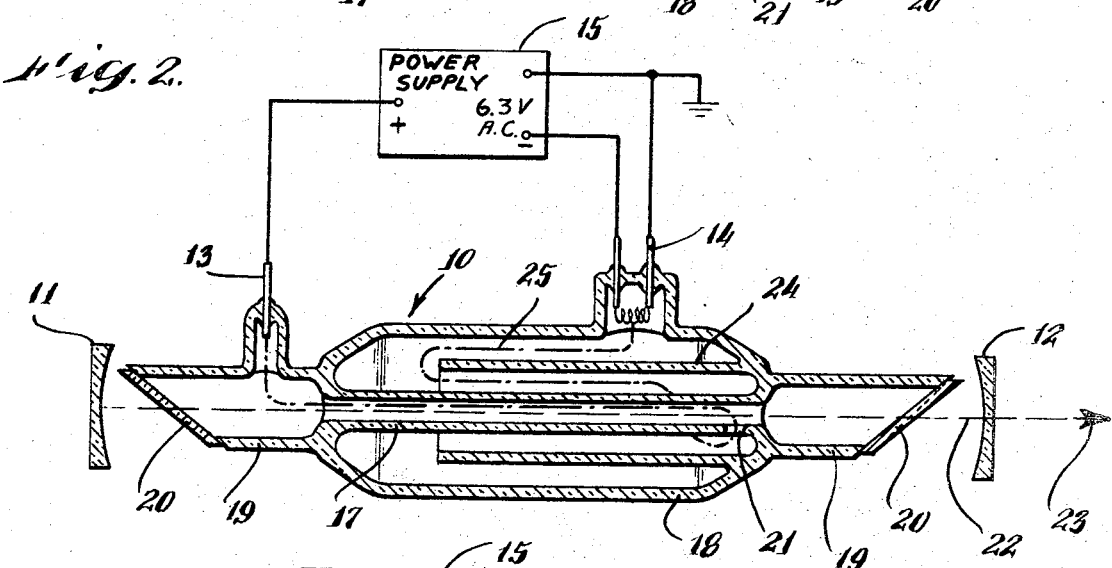
FIG. 2 is a cross-sectional view of an alternative embodiment of this invention; and, FIG. 3 is a cross-sectional view of another embodiment of this invention.

FIG. 2 illustrates a device similar to that shown in FIG. 1 except that an additional element comprising a cylindrical shield 24 is now provided which extends from the end of the reservoir tube 18 adjacent aperature 21. The shield is generally coaxial with the tubes 17 and 18 and extends therebetween. The purpose of shield 24 is to provide an additional guard against the introduction of sputtered material from the cathode into the discharge tube. In this case, the discharge path, indicated by dotted line 25, extends from the cathode through the reservoir tube, around the end of the shield 24 and then into the discharge tube via aperature 21. It is noted that other arrangements of the shield may be provided to serve the same function.

Figure 3:
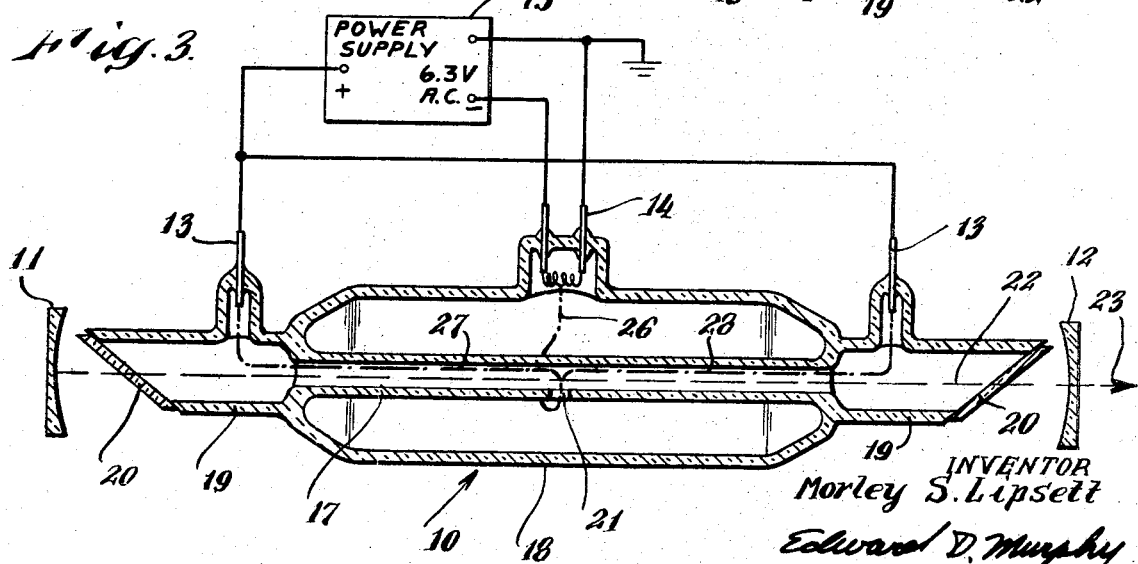

In FIG. 3, an alternative embodiment is llustrated which is structurally similar but which offers additional advantages in certain applications. In this case, the discharge tube 17 is again mounted within and supported at both ends by the reservoir tube 18, but now the cathode structure 14 is centrally located along the length of the reservoir tube and the aperture 21 is centrally located along the length of the discharge tube 17. Two anodes 13 are provided, one located in each tubular extension 19. Thus, the discharge follows path 26 from the cathode to the aperture and then divides into two portions as indicated by lines 27 and 28 to the respective anodes 13.

In this construction, the parameters given previously are generally repeated except that the tube is approximately twice as long. As compared to a single anode tube of similar length, the voltage applied is halved while the current is doubled. In addition to the reduced voltage requirement for a given power output, a particular benefit is that the inductive effect of the current in the single anode situation is cancelled because there are two currents traveling in opposite directions.

While I have shown and disclosed several embodiments of my invention it will be apparent to those skilled in the art that many changes and modifications may be made without departing from the concept of this invention.

What is claimed is:

1. A gas laser, comprising:
   a resonant cavity;
   a hermetically sealed enclosure within said cavity, said enclosure comprising wall means defining a reservoir tube having opposite ends and end walls extending across and closing said ends;
   a pair of tubular extensions projecting coaxially from the respective end walls and each having a sealing optical window for transmitting radiation therethrough;
   a discharge tube mounted within and supported by the respective end walls of said reservoir tube, said discharge tube being optically aligned with said resonant cavity and defining a discharge path penetrating the respective end walls so that the interior of said discharge tube communicates with said tubular extensions;
   anode means communicating with at least one of said tubular extensions;
   cathode means extending into said reservoir tube;
   aperture means in said discharge tube communicating with the interior of said reservoir tube located at a point on said discharge tube which is substantially diametrically opposed to the location of said cathode for permitting a discharge to be established between said anode means and said cathode means;
   a gaseous material capable of producing stimulated emission of radiation provided within said enclosure; and
   means for maintaining a discharge between said anode means and said cathode means to produce emission from said gaseous material.

2. A laser as claimed in claim 1, wherein said discharge tube and said reservoir tube consist essentially of a vitreous material, and wherein said end walls constitute continuous joints surrounding said discharge tube at each end thereof.

3. A laser as claimed in claim 2, further comprising cylindrical shield means for causing a discharge to traverse a circuitous path between said anode means and said cathode means, said shield means being located intermediate said reservoir tube and said discharge tube and surrounding said aperture means.

4. A laser as claimed in claim 1 wherein said discharge tube is rigidly supported by said end walls.

5. A laser as claimed in claim 1 wherein said cathode means and said aperture are centrally located along said enclosure and said anode means comprises a pair of electrodes, one of said electrodes being located at each extremity of said enclosure.

References Cited

UNITED STATES PATENTS

| | | | |
|---|---|---|---|
| 2,561,868 | 7/1951 | Jenkins et al. | 313—220 |
| 3,390,297 | 6/1968 | Vollmer | 313—204 X |
| 3,413,568 | 11/1968 | Gordon et al. | 331—94.5 |

RONALD L. WIBERT, Examiner

T. MAJOR, Assistant Examiner